US010514454B1

(12) United States Patent
Parrott

(10) Patent No.: US 10,514,454 B1
(45) Date of Patent: Dec. 24, 2019

(54) TECHNIQUES FOR MITIGATING THE EFFECTS OF COMPLEX STRUCTURES ON RADAR SYSTEMS

(71) Applicant: The U.S.A, as represented by the Administrator of the Federal Aviation Administration, Atlantic City International Airport, NJ (US)

(72) Inventor: Daniel Parrott, Oklahoma City, OK (US)

(73) Assignee: The United States of America, as represented by the Administrator of the Federal Aviation Administration, Washington, DC (US)

( * ) Notice: Subject to any disclaimer, the term of this patent is extended or adjusted under 35 U.S.C. 154(b) by 336 days.

(21) Appl. No.: 15/603,544

(22) Filed: May 24, 2017

Related U.S. Application Data

(63) Continuation-in-part of application No. 14/121,849, filed on Oct. 24, 2014, now abandoned.

(51) Int. Cl.
| | | |
|---|---|---|
| *G01S 13/538* | (2006.01) | |
| *G01S 7/292* | (2006.01) | |
| *G01S 7/41* | (2006.01) | |
| *G01F 1/66* | (2006.01) | |
| *G01P 5/24* | (2006.01) | |

(52) U.S. Cl.
CPC ............ *G01S 13/538* (2013.01); *G01F 1/663* (2013.01); *G01P 5/241* (2013.01); *G01S 7/2922* (2013.01); *G01S 7/415* (2013.01)

(58) Field of Classification Search
CPC ...... G01S 13/538; G01S 7/2922; G01S 7/415; G01P 5/241; G01F 1/663
See application file for complete search history.

(56) References Cited

U.S. PATENT DOCUMENTS 5,070,335 A * 12/1991 Lewis ..................... G01S 7/415
342/192
5,124,710 A * 6/1992 Debuisser ............. G01S 13/225
342/192

(Continued)

OTHER PUBLICATIONS

Farina, A, et al., A Review of CFAR Detection Techniques in Radar Systems, 1986, Selenia Industrie Elettroniche Associate SpA, (Year: 1986).*

(Continued)

*Primary Examiner* — Frank J McGue
(74) *Attorney, Agent, or Firm* — Lise A. Rode

(57) ABSTRACT

Embodiments described herein provide for the improved detection of target(s) in the vicinity of cluttered environments such as wind farms, and for the reduction of false alarms resulting from wind turbines and other complex structures in such environments. Maximum amplitude readings of all non-zero Doppler frequency bins are determined for each resolution cell under test during a dwell and used to determine an aggregate threshold value. In one embodiment, the aggregate threshold value and an existing threshold value are compared and the higher value applied. A tracking sample period and a transition state delay are introduced to determine when the aggregate threshold value for each resolution cell under test should be updated.

21 Claims, 7 Drawing Sheets

(56) References Cited

U.S. PATENT DOCUMENTS

| | | | | |
|---|---|---|---|---|
| 6,937,185 | B1* | 8/2005 | Collazo | G01S 13/5244 342/159 |
| 8,013,781 | B2* | 9/2011 | Stockmann | G01S 13/5248 342/159 |
| 2008/0106460 | A1* | 5/2008 | Kurtz | G01S 7/352 342/99 |
| 2011/0223031 | A1* | 9/2011 | Bond | G01S 7/414 416/229 R |
| 2011/0241928 | A1* | 10/2011 | Oswald | G01S 13/42 342/90 |
| 2012/0026031 | A1* | 2/2012 | Goodman | G01S 7/2923 342/159 |
| 2012/0105272 | A1* | 5/2012 | Moruzzis | G01S 7/414 342/159 |
| 2013/0201054 | A1* | 8/2013 | Wang | G01S 13/0218 342/93 |
| 2013/0314268 | A1* | 11/2013 | Fukuda | G01S 13/0209 342/21 |

OTHER PUBLICATIONS

Buterbaugh, et al., "Dynamic Radar Cross Section and Radar Doppler Measurements of Commercial General Electric Windmill Power Turbines" Air Force Research Laboratory, United States (Jul. 16, 2008); 7 pages. retrieved from Internet here: http://users.ece.utexas.edu/~ling/US3%20AMTA%20Wind%20Turbine%20-%20Part%202.pdf.

Rohling, "Radar CFAR Thresholding in Clutter and Multiple Target Situations, IEEE Transactions on Aerospace and Electronic Systems," vol. AES-19, No. 4 United States (Jul. 1983); 14 pages.

Ohs, et al., "Modeling the Effects of Wind Turbines on Radar Returns," Remcom, Inc., United States, (2010 Military Communications Conference); 6 pages.

Office of the Director of Defense Research and Engineering, "The Effect of Windmill Farms on Military Readiness 2006," Report to the Congressional Defense Committees (2006), United States; 62 pages retrieved from Internet here: http://archive.defense.gov/pubs/pdfs/WindFarmReport.pdf.

* cited by examiner

TECHNIQUES FOR MITIGATING THE EFFECTS OF COMPLEX STRUCTURES ON RADAR SYSTEMS

CROSS-REFERENCE TO RELATED APPLICATIONS

This application is a continuation-in-part and claims the benefit of U.S. patent application Ser. No. 14/121,849 filed Oct. 24, 2014 and entitled "Stationary Doppler Target Suppressor," which is incorporated by reference herein in its entirety.

TECHNICAL FIELD

The disclosed embodiments relate to the field of radar detection. More specifically, said embodiments relate to the improved detection of target(s) in the vicinity of cluttered environments such as wind farms, and to the reduction of false alarms resulting from wind turbines and other complex structures in such environments.

BACKGROUND

The continuing desire and demand for cost-effective, sustainable, low-emissions power generation sources has in large part driven public and private sector interest in wind energy. According to the United States Department of Energy's 2008 20% Wind Energy by 2030 and March 2015 Wind Vision Report reports, the percentage of electricity generated by wind energy in the United States is projected to increase from approximately 4.5% in 2013 to nearly 20% by 2030 and 35% by 2050. In 2015, global investment in wind generation reached $110 billion, while in the United States alone investments reached $44 billion.

While increased wind power generation is generally considered desirable, the installation of the wind turbines used to generate this power (often co-located in "wind farms") interfere with radar systems such as used for air traffic control and air defense missions. Current radar systems have a detection radius of up to 250 nautical miles and are affected by wind turbines within a 196,000 square mile detection area. The number, size, and height of the turbines as well as the blade rotation are known to impair/degrade the performance of radar systems in at least two ways: 1) by causing strong echoes from the turbine structure itself (thus possibly obscuring a target of interest); and, 2) as a result of Doppler frequency shifts due to the movement of the wind turbine blades with respect to the radar receiver (falsely suggesting that the wind turbine is moving in relation to the radar and thus is a possible target of interest).

The principle of operation of radar systems is generally straightforward, and may be understood with reference to FIG. 1, which illustrates a simplified version of an exemplary known pulse radar system. A signal generated and amplified at transmitter 110 is emitted from antenna 130 via switch (e.g., duplexer 120) in the form of continuous or pulsed radiofrequency waves that propagate outward from the antenna 130. Any object illuminated by the transmitted signal reflects some of this energy (generally referred to as "echoes" or "returns") back to the radar's receiver 140 where it is digitized 150 and subsequently further processed for various information (e.g., "range" (or line of sight distance from radar to target) as well as azimuth (or bearing) and elevation (both determined by measuring the direction in which the antenna is pointed when the echo is received)). In pulse radar systems such as the Air Route Surveillance Radar ("ARSR") used by the U.S. Air Force and the Federal Aviation Administration, energy is transmitted using a coherent train of modulated pulses and the return or echo signals are received in between the transmitted pulses.

In addition to range, azimuth, and bearing information, many radar systems exploit the Doppler effect by analyzing any frequency shift between the return signal(s) and the transmitted signal to ascertain how an object's motion has altered and thus to determine the radial velocity (or, "range-rate") of the object(s) returning the echo(es) to the radar itself. This Doppler shift also allows a radar system to discriminate a moving target of interest from an object not of interest (i.e., "clutter")

Early improvements for suppression of clutter in pulse radar systems included the adoption of moving target indication (MTI) that, through the use of delay-line cancelers, provided for the improved suppression of the display of echo signals from objects that were stationary or quasi-stationary. Pulse-Doppler or pulse radars were later devised to improve upon MTI radars and were designed to operate in severely cluttered environments conditions, where signals from targets of interest were received together with signals from many other objects in the environment.

Pulse-Doppler radar systems use Doppler frequency processing 164 to convert the time-domain reflected radar signals into the frequency domain, such that any Doppler shift appears as a change in phase of received signals between consecutive radar pulses. More specifically, returns from each transmitted pulse are received by an array of sensors, digitized, and then stored in memory "bins" according to range and time of arrival relative to the transmitted pulse. Each range-time bin is made up of a number of multidimensional range resolution cells, where a "range resolution cell" or "range cell" corresponds to a given distance of the radar and is generally understood to be the smallest range increment a particular radar system is capable of detecting. (The total number of range cells for a radar system may be determined by dividing the total range of the radar into its range resolution).

Subsequently, each set of sampled pulses for each range cell is then provided to a bank of narrow-band digital filters (in processing block 164) where they are preferably Fourier-transformed. The magnitude of each output of each spectral band is determined and the outputs subsequently stored in Doppler frequency bins. More specifically, each of the Doppler filters in the bank has a predetermined separate threshold that is used for determining the Doppler, or radial, velocity of the target that is the subject of the returned signal. This threshold may be hard-coded in software, burned into firmware or hardwired. If the amplitude out of the output of the returned signals from targets having zero velocity (i.e., are stationary) are placed into one memory bin, while the amplitude of those returned signals from targets that have a non-zero velocity (i.e., are moving) are input into non-zero Doppler frequency bins. The signal in a particular range-Doppler frequency bin thus corresponds to a signal from an object, or a portion of the illuminated area, at that range and moving with a particular speed. This signal processing thus allows the separation of moving targets from slow-moving clutter. The signal filter processing techniques as discussed above have been used in later pulse radar systems such as later generations of MTI radar systems (e.g., pulsed coherent MTI) as well as in MTD radar systems. (As known in the art, MTD radar systems generally combine Doppler filter banks adapted to process groups of pulses with a fine grained clutter map that is used to establish thresholds for zero radial velocity cells).

After these signal processing steps, detection and thresholding generally involves applying a detection process such as constant false alarm rate (CFAR) (included in block 172). At its basic level, a detection process such as CFAR involves comparing the signal power level of a particular range cell under test (CUT) with local average signal power level. This local average signal power level may be determined by calculating an average over adjacent ranges but within the same Doppler frequency bin, or over adjacent Doppler frequency bins. If the ratio of the signal power level for the CUT to the local average signal power level exceeds a predetermined or selected threshold, a target is declared and may be indicated on the radar display dependent on further processing. One challenge arising from existing detection systems is the difficulty in adjusting a threshold so as to provide a balance between providing adequate sensitivity in identifying a target while still eliminating sufficient clutter.

While the foregoing and similar techniques have proven reasonable for distinguishing targets of interest from stationary, quasi-stationary, and objects having an expected velocity profile, they have been less successful in addressing the challenges presented by wind turbines because of their size and their complex Doppler frequency profile. More specifically, with regard to the first technical challenge, wind turbines present a very large radar signature or radar cross section (RCS) compared with intended targets. The cumulative effect of the turbine tower and the blades can present a radar echo larger than that of a Boeing 747. Due to the excessively large echo received from the turbine, the radar system can mistakenly identify the turbine as a target of interest and overlook real airborne targets in front of, behind, or over the top of the turbine. Thus the clutter created by wind turbines can result in a virtual complete loss of radar detection of real targets above, in, and around wind farms.

Furthermore, as known in the art, the blades of the wind turbine can present velocities that range from 0 (at the hub) to more than 200 mph (tip of the blade). It will thus be appreciated that this design leads to the second technical challenge: wind turbines produce dramatic outlier readings for amplitude and velocity and readings that fluctuate significantly over periods of time. The fluctuation results from the large permutation of positional variations of the wind turbine blades when the turbine is being illuminated by the radar system. Accordingly, each time a radar signal comes into contact with a blade at a different position, the system perceives a change in amplitude and velocity in the return signal, thus signifying a retreating or advancing object that may lead to an erroneous detection of a target. A resulting false alarm may thus be triggered. This compounds the previously-identified existing challenge for detection techniques.

Other complex structures (e.g., vehicles traveling along a road) present similar challenges in detection techniques.

As a result of the foregoing, and despite their desirability, wind turbines and wind farms and other complex structures severely impair the ability of radar systems to discriminate between wanted and unwanted targets and, as a result, potentially compromise airspace safety and national security interests. Therefore, it is desired to provide in such environments techniques to improve detection of target(s) in the vicinity of cluttered environments such as wind farms and to reduce false alarms resulting from wind turbines and other complex structures.

SUMMARY

A brief summary is provided herein to help enable a basic or general understanding of various aspects of exemplary embodiments that follow in the more detailed description and the accompanying drawings. This summary is not intended as an extensive or exhaustive overview but rather to present concepts as a prelude to more detailed description of the various embodiments that follow in the disclosure.

According to one aspect of the subject matter described in this specification an apparatus for improving target detection in complex structure environments such as wind farms comprises a first threshold processor module operatively coupleable to receive for each resolution cell of the pulse radar system data representing amplitude values from signal filter processing means of the pulse radar system, wherein the first threshold processor module is adapted to determine for each resolution cell of the pulse radar system a first threshold value, the first threshold value calculated determined using a detection threshold-determining process; a second threshold processor module operatively coupleable to receive for each resolution cell of the pulse radar system data representing amplitude values from signal filter processing means of the pulse radar system, wherein the second threshold processor module is adapted to determine a maximum amplitude value for each resolution cell of the pulse radar system, and wherein the second threshold processor module is further adapted to determine for each resolution cell a second threshold value, wherein the second threshold value is an aggregate threshold of a plurality of past maximum amplitude values over a selected number of dwells of the pulse radar system; and a comparator adapted to compare thresholds received from the first and second threshold processor modules for determining an applied threshold value for each of the resolution cells wherein the applied threshold value is the greater of the first threshold value and the second threshold value, the comparator providing the applied threshold value to the pulse radar system to update a detection threshold value of each of the resolution cells with the applied threshold.

According to another aspect of the subject matter described in this specification, a map data structure is stored in memory means of the pulse radar system, the map data structure including a plurality of detection cells, each of the detection cells associated with code indicating the presence or absence of an object located in the detection cell; the comparator is further adapted to apply the first threshold value if the code indicates the absence of an object located in the detection cell and is further adapted to apply the applied threshold value if the code indicates the presence of an object located in the detection cell.

In another aspect of the subject matter described in this specification, the second threshold processor module is configurable to adjust the plurality of past maximum amplitude values used to determine the aggregate threshold.

In yet another aspect of the subject matter described in this specification, an improved method for target detection in complex structure environments such as wind farms is provided. In one embodiment, in response to at least one radar dwell, data representing amplitude values is received from signal filter processing means of the pulse radar system for each resolution cell of the pulse radar system; the signal filter processing means determines a maximum amplitude value for each resolution cell for the at least one radar dwell; a first adjustable number of determined maximum amplitude values is compared for the at least one radar dwell in order to determine an aggregate maximum amplitude threshold value for each resolution cell wherein the first adjustable number of determined maximum amplitude values includes oldest maximum amplitude values for each resolution cell; the aggregate maximum amplitude threshold value is compared with a determined detection threshold value for each resolution cell; and, the greater of the aggregate threshold value and the determined threshold value is applied to update a threshold value for each resolution cell.

In further aspects of the subject matter described in this specification, a plurality of the maximum amplitude values including the first adjustable number of determined maximum amplitude values is stored in a plurality of storage locations of at least one positional array after each radar dwell and each of the plurality of storage locations is updated with new maximum amplitude values for each resolution cell after each radar dwell. The plurality of the maximum amplitude values includes a second adjustable number of determined maximum amplitude values, wherein the second adjustable number of determined maximum amplitude values includes a selected number of most recent maximum Doppler amplitude values for each resolution cell.

It will be understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The aspects and examples of the systems and techniques of the disclosure will be more fully understood from the following detailed description taken in conjunction with the accompanying drawings, in which.

DETAILED DESCRIPTION OF EXEMPLARY EMBODIMENTS

Certain exemplary embodiments will now be described to provide an overall understanding of the principles of the structure, function, manufacture, and use of the systems and techniques disclosed herein. Those skilled in the art will understand that the exemplary embodiments specifically described herein and illustrated in the accompanying drawings are non-limiting examples and any embodiment or feature described herein as "exemplary," "example," or "illustrative," is not necessarily to be construed as preferred or advantageous over other embodiments or features. Furthermore, the features illustrated or described in connection with one exemplary embodiment may be combined with the features of other exemplary embodiments and such modifications and variations are intended to be included within the scope of the present disclosure. The scope of the present disclosure is defined solely by the appending claims and not affected by the statements made within this summary.

Figure 1:
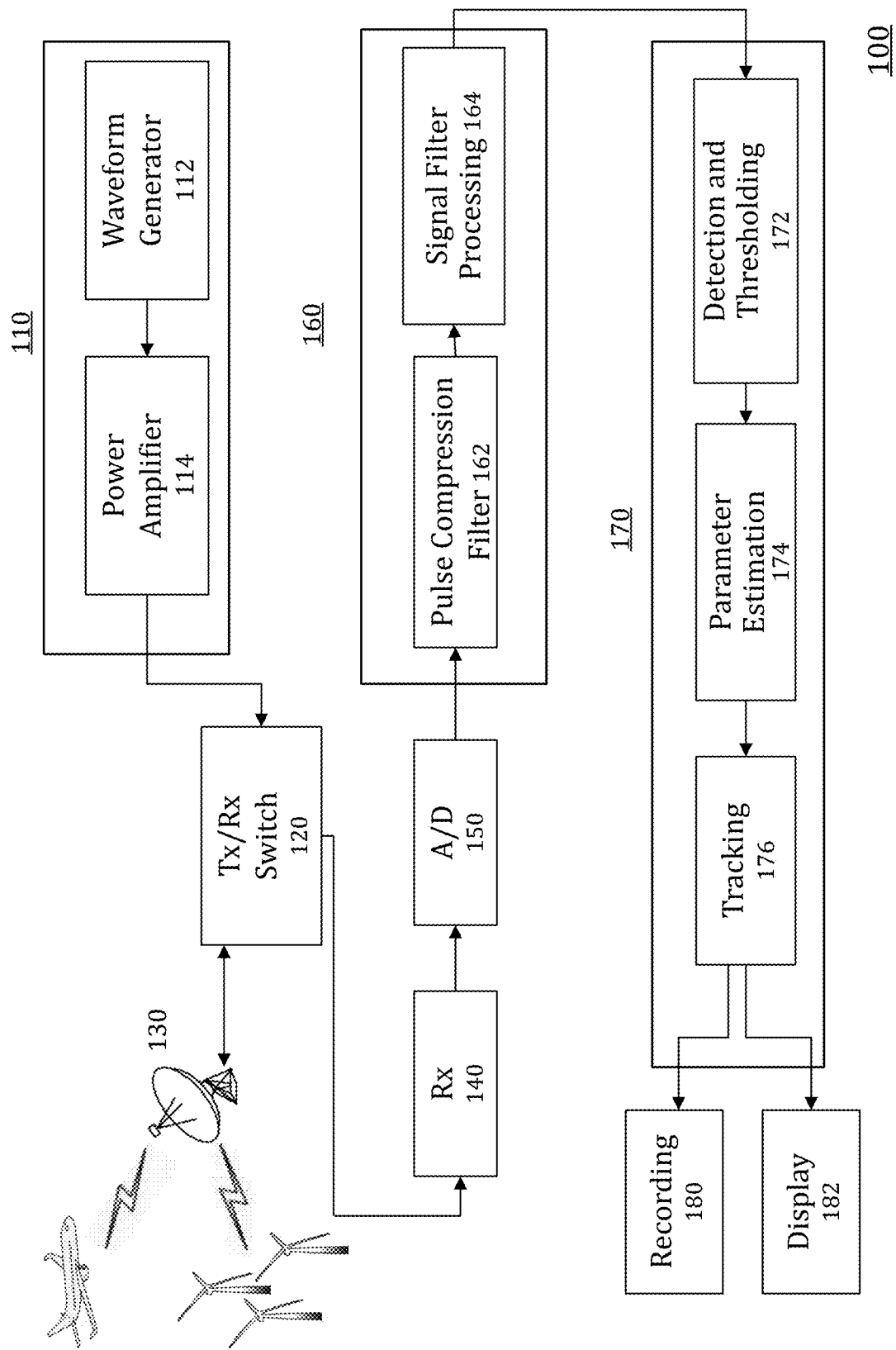
FIG. 1 is an exemplary embodiment of a known pulse radar system.
Figure 2:
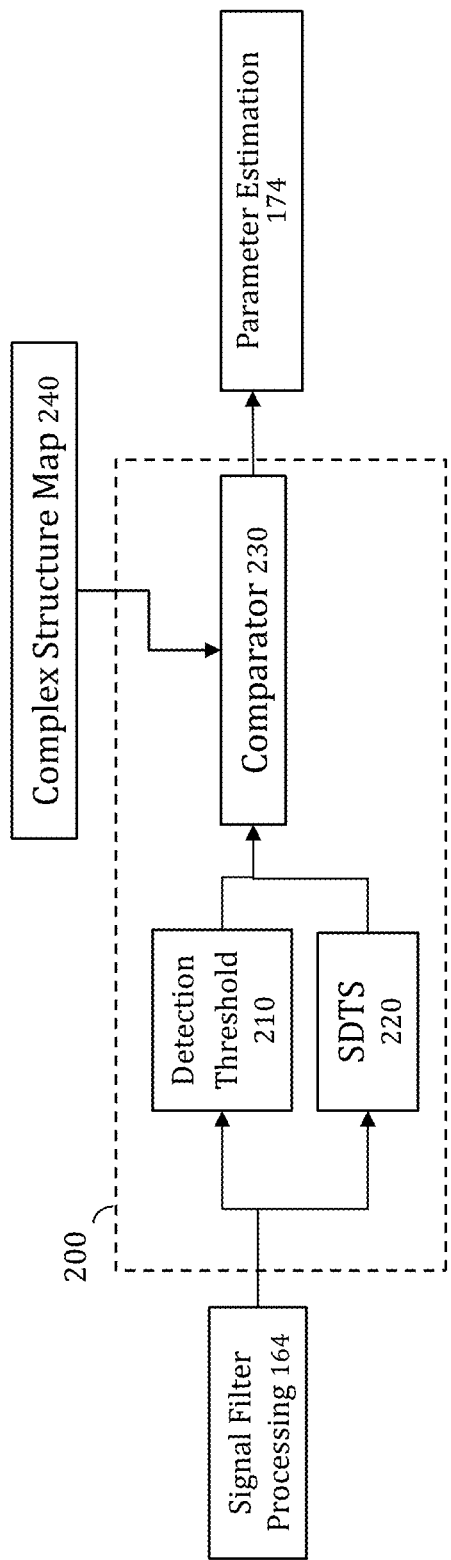
FIG. 2 illustrates a pulse radar system including an embodiment of the platform-independent Stationary Doppler Target Suppressor (SDTS) 200.

FIG. 2 sets out an exemplary embodiment of a platform-independent Stationary Doppler Target Suppressor (SDTS) component or module 200, which may be adapted to operate with an existing pulse radar system, particularly in environments where wind turbines and other complex targets of interest are present. In the embodiment shown in FIG. 2, SDTS 200 is operatively coupled to receive amplitude values from Doppler filters included in signal filter processing 164. More specifically, the amplitude values are input to SDTS module 200 for calculation of a desired detection threshold for the radar system. It will be appreciated that if the detection threshold is set too high, the probability of detecting targets of interest decreases significantly; if the detection threshold is set too low the resulting false alarms undesirably increases.

SDTS module 200 preferably includes a detection threshold processor module 210, Stationary Doppler Target Suppressor (SDTS) threshold processor module 220, and comparator 230. In one embodiment, detection threshold processor module 210 calculates for each resolution cell under test (CUT) a threshold using an average of amplitude values from resolution cells adjacent to the CUT. However, as known, the threshold may also be calculated over adjacent Doppler frequency bins.

As with detection threshold processor module 210, Stationary Doppler Target Suppressor (SDTS) threshold processor module 220 receives amplitude values from the Doppler frequency bins 164 and computes a threshold for each resolution cell under test (CUT). However, unlike the detection threshold processor module 210, SDTS threshold processor module 220 determines for each cell under test a maximum amplitude and, in a preferred embodiment, a combined (or aggregate) threshold of all maximum amplitude outputs received from all non-zero Doppler frequency bins.

As reflections from complex structures such as wind turbines may not be present in a cell under test for every dwell, past techniques using average amplitudes for a cell over several dwells resulted in a threshold that was too low and that led to increased false alarms. In accordance with the present techniques, SDTS threshold processor module 220 improves on past techniques by determining maximum amplitude readings for each resolution cell under test. An aggregate of these maximum amplitude readings will then be used by SDTS threshold processor module 220 in determining its output threshold for each cell under test.

According to one embodiment, in determining the maximum amplitude reading for each resolution cell under test, SDTS threshold processor module 220 reads out the maximum amplitude from all non-zero Doppler frequency bins after a series of N dwells. In another embodiment the maximum amplitude reading is read out from all non-zero Doppler frequency bins after each dwell in the series of N dwells and then each of the maximum amplitude readings from each dwell is compared after all N dwells to determine the overall maximum amplitude reading. In accordance with yet another embodiment, the SDTS threshold processor module 220 further determines a separate aggregate maximum amplitude reading for all zero Doppler frequency bins in a similar manner. In one embodiment, the zero Doppler frequency bins includes input from signal processing filters with minimal Doppler shift as well as zero Doppler shift.

The thus-determined maximum amplitude reading is a present value for the resolution cell under test for which a threshold is to be generated.

After determining the present value maximum amplitude for the resolution cell under test, SDTS threshold processor module 220 further determines how the threshold should be updated by determining a transition state delay and a tracking sample period. Each of these parameters improves the responsiveness of SDTS module 200 in adapting to changes in the environment.

It has been observed that wind turbine returns may not only appear in any of the non-zero Doppler frequency bin filters but that such returns do not consistently appear in the same signal processing filter (e.g., during "blade flashes" when the radar line of sight is orthogonal to a blade of a wind turbine resulting in a received return signal having a complex Doppler spectrum spread across many Doppler frequency bins). In order to account for this effect, a tracking sample period is introduced.

More specifically, an adjustable number of past maximum amplitudes for each resolution cell from a past scans is selected as input to SDTS threshold processor module 220. This tracking sample period aspect allows the system to account for Doppler events such as blade flashes by adjusting the time it takes for a past maximum amplitude to age out of the threshold determination process. The larger the tracking sample period the longer it will take for the maximum amplitude to cycle out of the threshold calculation.

The transition state delay aspect of SDTS threshold processor module 220 determines how quickly the present value of the maximum amplitude for the cell under test is introduced into the tracking sample period. The transition state delay allows for the raising of the threshold whenever there is Doppler activity caused by movement and keeps that threshold raised until the movement and Doppler activity subsides. The transition state delay aspect is found to be important in ensuring that a slow-moving aircraft (i.e., one that still "occupies" the same cell on a next dwell) is not impacted by a higher threshold due to its own past return signal in that cell thus resulting in a missed detection by SDTS module 200.

In one embodiment, SDTS threshold processor module 220 carries out the tracking sample period and transition state delay by storing maximum amplitudes in a positional array 301 and sequentially applying the values in a manner discussed below. It will be appreciated that any other similar data structure having multiple storage locations and that allows for historical storage and sorting of data may be used. In certain embodiments, the positional array 301 may be carried out in a circular buffer or other storage data structure.

Figure 3:
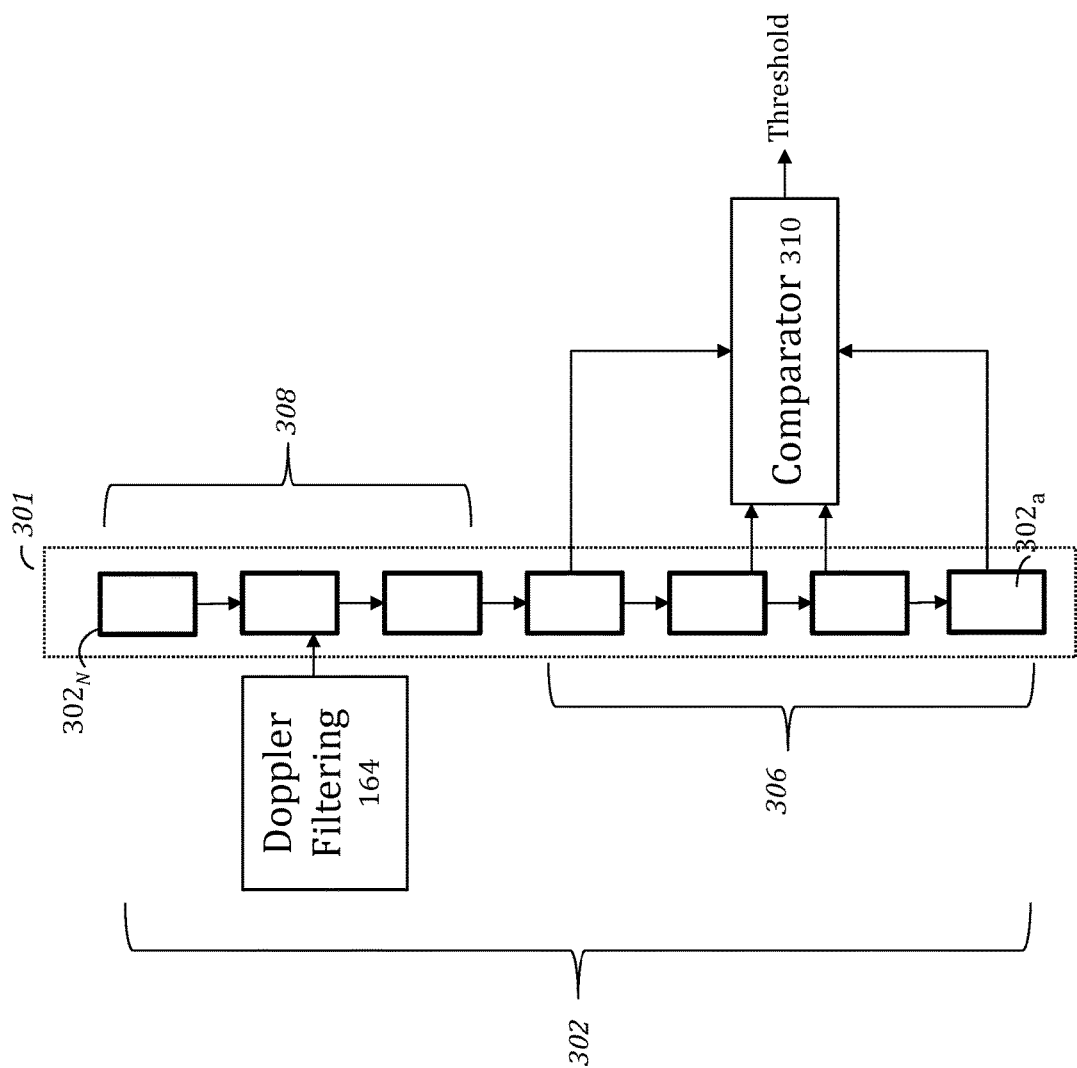
FIG. 3 is a diagram illustrating the transition state delay and tracking sample period process of SDTS threshold processor module 220.

FIG. 3 illustrates one embodiment of the tracking sample period and transition state delay aspects of SDTS threshold processor module 220.

As seen therein, SDTS threshold processor module 220 receives as input for each cell under test maximum amplitude outputs from all non-zero Doppler frequency bins 164 for that cell. In accordance with the techniques disclosed above SDTS threshold processor module 220 stores in a positional array 301 or similar data structure N maximum amplitude outputs 302 for each resolution cell under test. From that number, an adjustable number, T, of past maximum amplitudes 306 is read out from the positional array 301 for providing as input to comparator 310. Comparator 310 compares these maximum amplitudes 306 and outputs an aggregate threshold value as the output threshold for SDTS threshold processor module 220.

It will thus be appreciated that the number of maximum amplitudes 306 input into comparator 310 impacts the return of the peak threshold resulting from Doppler events like "blade flash" to normal; the smaller the tracking sample period the quicker the return of the peak threshold to normal; the larger the tracking sample period the longer the threshold takes to return to normal. In a preferred embodiment the tracking sample period is at least twenty. However, it will be understood that as the tracking sample period is adjustable other sizes may be selected.

The maximum amplitudes 302 that are stored in the positional array 301 but that are not input into comparator 310—i.e., M maximum amplitudes 308 (where M=N−T)—act as a transition state delay. Again, the transition state delay determines the time it takes to increase the threshold whenever there is Doppler activity caused by movement and keeps that threshold raised until the movement and Doppler activity subsides. Thus detection of slow-moving aircraft will not be impacted by a higher threshold due to its own past return signal in that cell. In a preferred embodiment the transition state delay is three.

As seen in FIG. 3 the maximum amplitude outputs 302 are periodically cycled through the positional array 301 from oldest $302_a$ to newest $302_N$ to make room for newer present value maximum amplitude. Digital comparator 230 of SDTS module 200 compares input thresholds and outputs the highest value threshold. Data from wind farm map 240 is input to comparator 230 and is preferably a map data structure containing detection cells that identify the locations of wind turbines or other complex structures installed in the radar coverage area. Wind farm map 240 may be carried out as a range azimuth map including a grid having a number of detection cells and may be manually input into memory storage of a pulse radar system (e.g., pulse radar system 100) or it may be automatically generated.

In one embodiment if the region under test does not include wind turbines or is not a wind farm area, the threshold output from detection threshold processor module 210 is always used. If the region under test includes wind turbines or is a wind farm area, then the output thresholds from detection threshold processor module 210 and SDTS threshold processor module 220 are compared at comparator 230 and the higher threshold value selected and applied. In this embodiment, each detection cell of wind farm map 240 preferably has associated code indicating the presence or absence of wind turbines which may be assigned based on data from a wind farm configuration object containing data about a particular wind farm. In one embodiment, if a cell is marked "1" the techniques disclosed herein are applied to that cell; if a cell is marked "0" the techniques disclosed herein are not applied to that cell.

Figure 4:
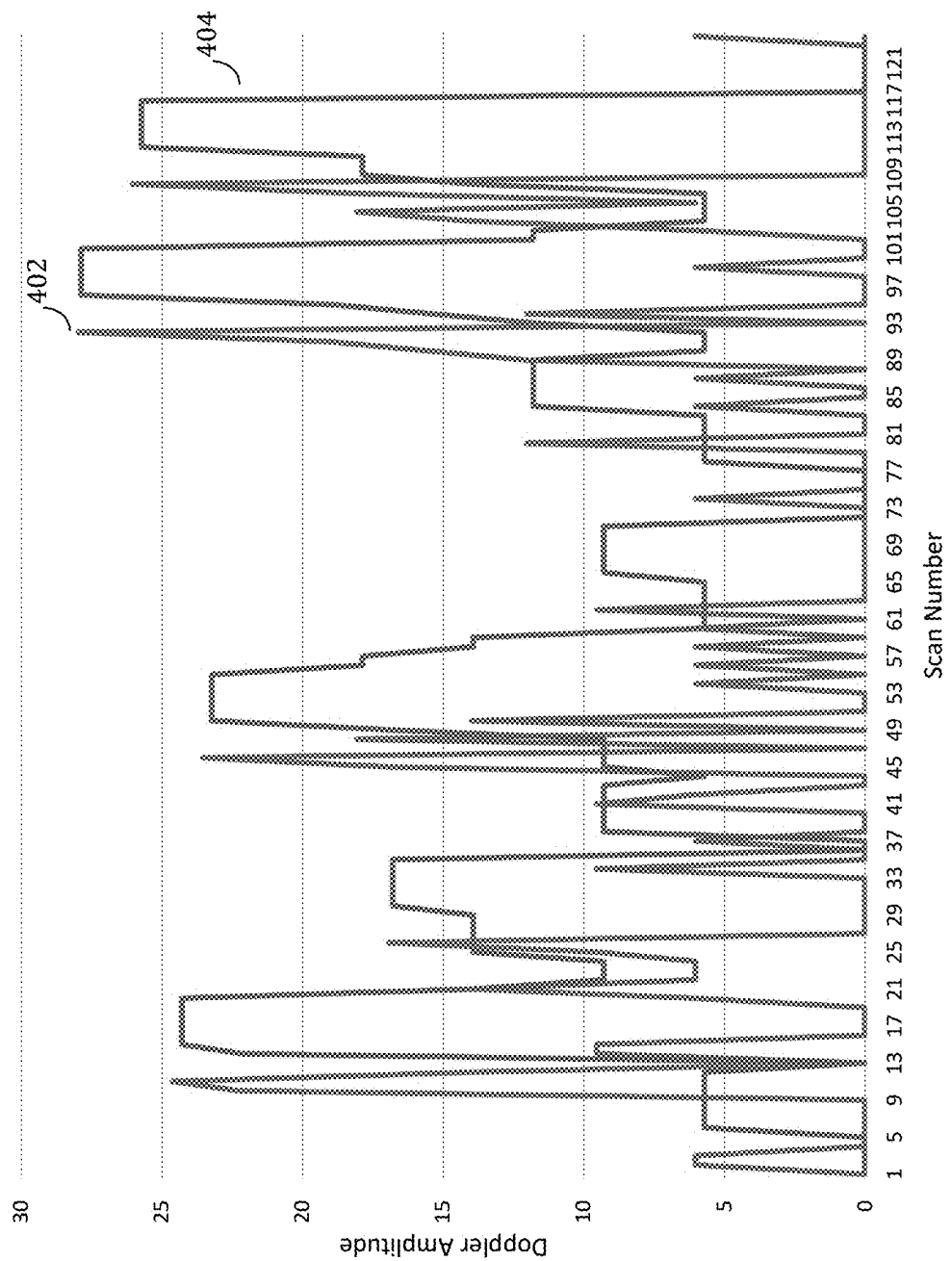
FIGS. 4-6 illustrate the SDTS threshold processor module 220 threshold outputs for varying values of transition state delays and tracking sample periods.
Figure 5:
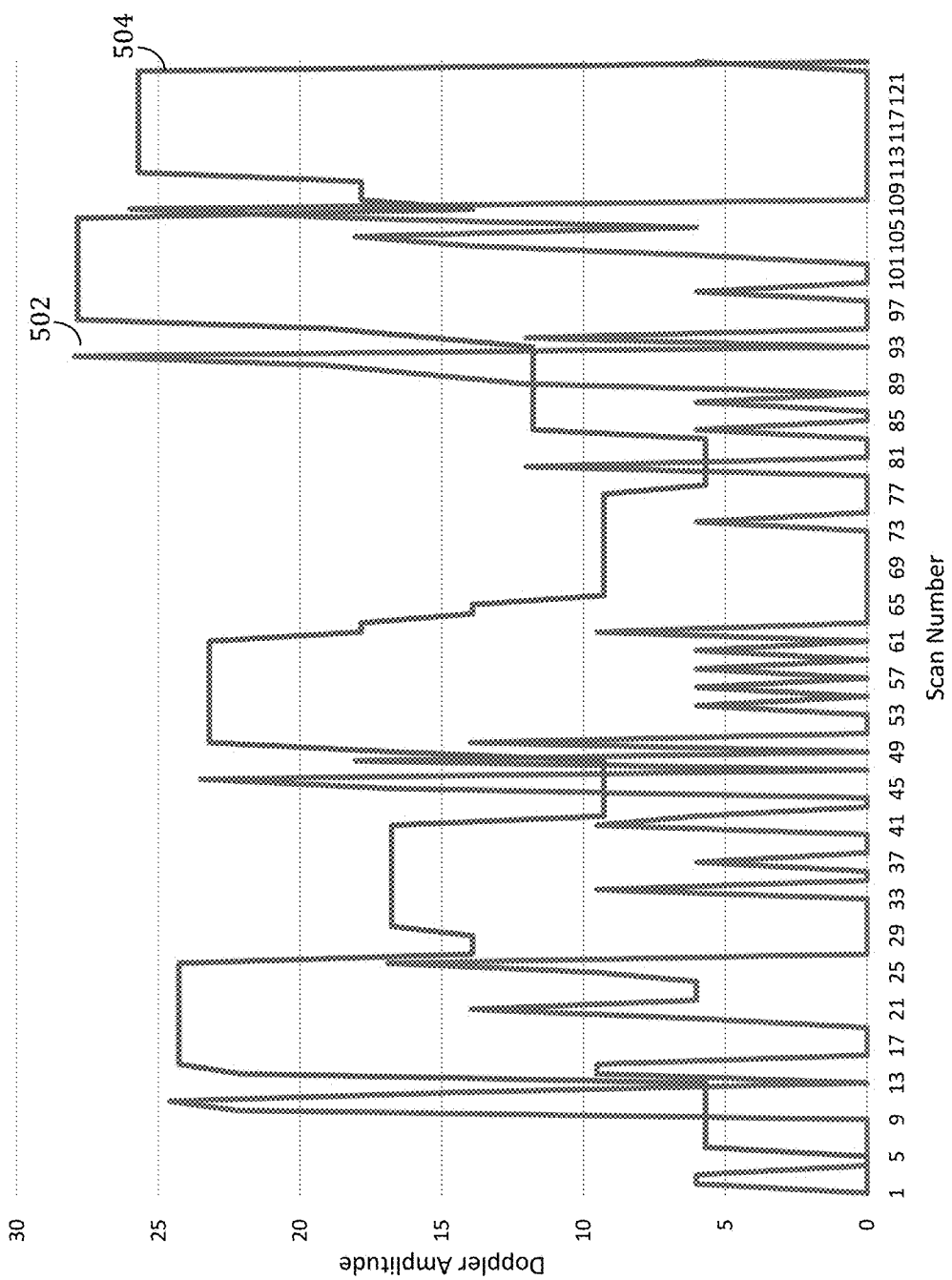
Figure 6:
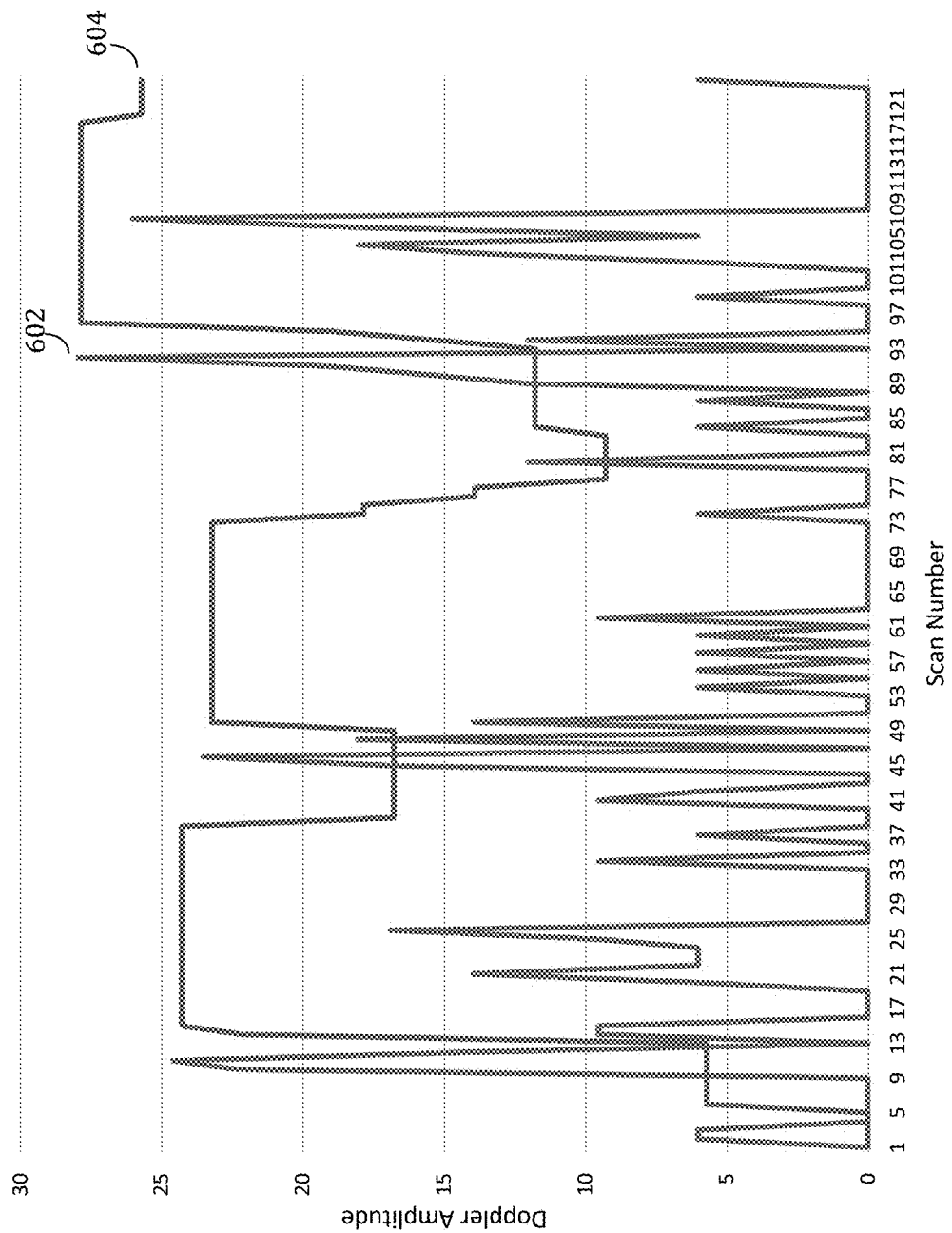

FIGS. 4-6 illustrate the operation of SDTS threshold processor module 220 and the effects of varying values of transition state delays and "tracking sample periods" on the threshold output. Doppler return signals are generally indicated at 402, 502, 602 while the output threshold as a result of the SDTS threshold processor module 220 is generally indicated at 404, 504, 604.

In the example of FIG. 4, the adjustable number of maximum amplitude outputs 302 stored in the positional array 301 is nine while the "tracking sample period" 306 includes six past maximum amplitude outputs. By not including the three most recent samples (i.e. as transition state delay 308) the onset of a blade flash is delayed for three dwells, while six scans are used to age out the blade flash or similar Doppler event. As shown in the graph the false alarm rate is high, because the threshold returns to nominal after just six scans. In the example of FIG. 5, the adjustable number of maximum amplitude outputs 302 stored in the positional array 301 is fifteen while the "tracking sample period" 306 includes twelve maximum amplitude outputs. As will be appreciated from the graph, the false alarm rate is improved. Finally, in FIG. 6, the adjustable number of maximum amplitude outputs 302 stored in the positional array 301 is twenty-seven while the "tracking sample period" 306 includes twenty-four maximum amplitude outputs. The false alarm rate is now at an optimal level for the system, as the threshold remains elevated long enough to suppress most blade flashes while still permitting for good detection of targets.

Figure 7:
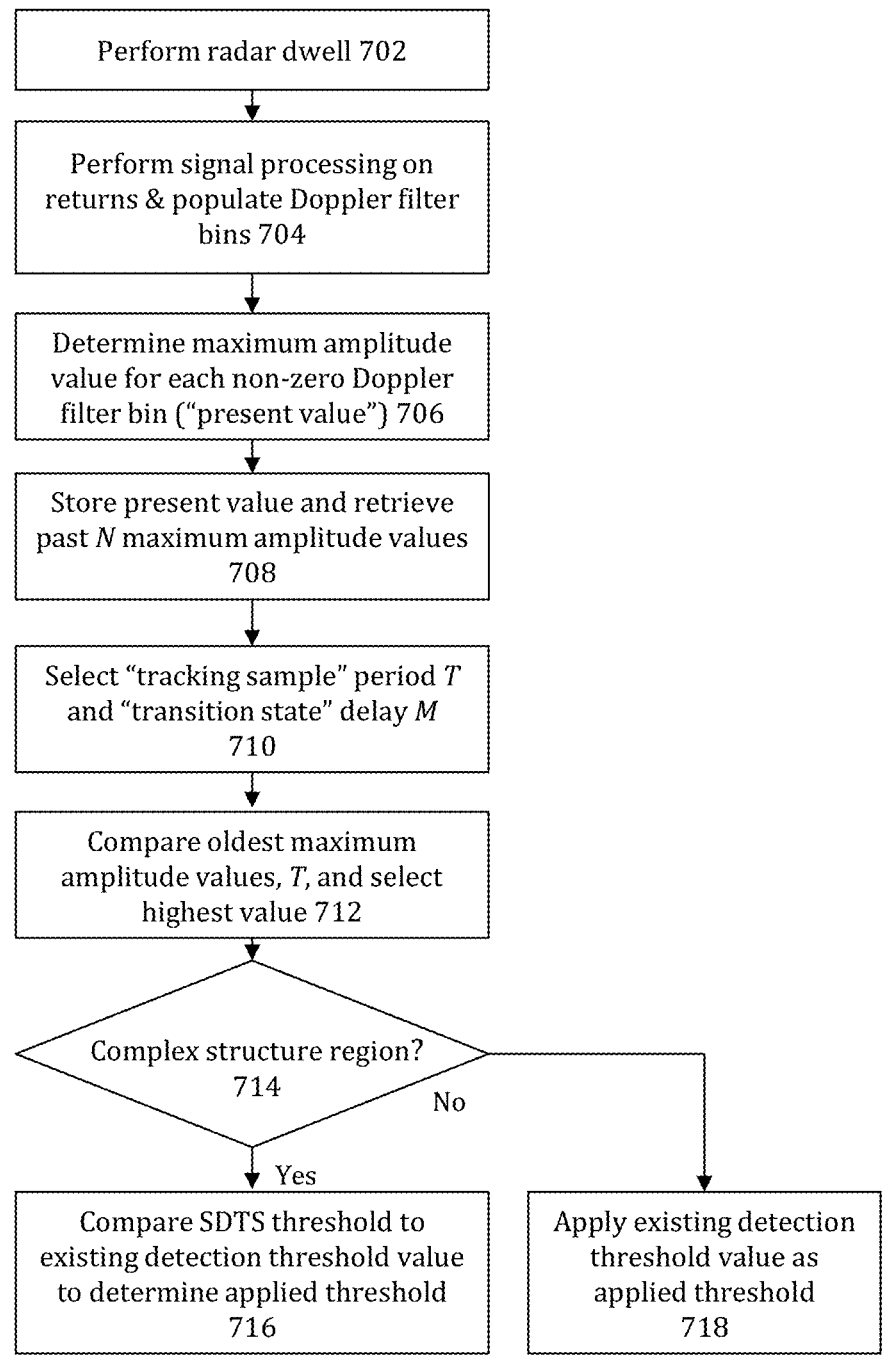
FIG. 7 illustrates an exemplary methodology using an embodiment of the SDTS threshold processor module 220 for updating the detection threshold for each range cell under test.

FIG. 7 illustrates an exemplary methodology using an embodiment of the SDTS module 200. The methodology is carried out for each resolution cell under test.

At steps 702 and 704, a radar dwell is performed and signal processing on the returns is performed. Doppler filter bins are populated according to the results of the processing (704). A maximum amplitude is then selected. In the embodiment of FIG. 7, the maximum amplitude is selected for each non-zero Doppler filter bin 706. This is the present value maximum amplitude for the resolution cell (e.g. $302_N$ in FIG. 3). At step 708 the present value is stored and previously-stored past N maximum amplitude values are retrieved. In a preferred embodiment these values are stored in a positional array 301. The oldest value in the storage (e.g., the positional array 301) is then deleted and a new present value is introduced.

From those N maximum amplitude values an adjustable tracking sample period T is selected and transition state delay M determined (step 710) In the embodiment shown in FIG. 7, SDTS module 200 determines if the region under test includes wind turbines or is a wind farm area (step 714). If the region under test does not include wind turbines or is not a wind farm area, the threshold output from the detection threshold processor module is always used (step 718). If the region under test includes wind turbines or is a wind farm area, then the output thresholds from the detection threshold processor module and the SDTS threshold processor module are compared and the higher threshold value selected and applied.

It will be appreciated from the foregoing that by selecting as a threshold for each cell in a wind farm region a maximum amplitude from an aggregate of the outputs of all non-zero Doppler frequency bins over a predefined multiple dwells and applying transition state delays and a "tracking sample period" the system is able to determine for which cells a higher threshold should be applied and for which a lower threshold should be applied. As a result, target detection in the vicinity of cluttered environments such as wind farms is greatly improved and the number of false alarms is reduced.

Although a few example implementations have been described in detail above, these should not be construed as limitations on the scope of what may be claimed, but rather as descriptions of features that may be specific to particular embodiments. Thus, other modifications and embodiments are possible and are within the scope of the appended claims and equivalents thereof. For example, the disclosed embodiments are applicable to many types of Doppler radar systems including but not limited to pulse-based radar systems such as the Air Route Surveillance Radar ("ARSR") used by the U.S. Air Force and the Federal Aviation Administration. Further, "pulse radars" will be understood to include any radar system, methodology, or technique that exploits the Doppler frequency shift to discriminate between moving and fixed target and includes all coherent pulse radar systems including but not limited to, Moving Target Indication (MTI), Moving Target Detector (MTD), and Pulse Doppler radars. Similarly, the logic flows and actions recited in the depicted figures and recited in the claims do not require the particular order shown, or in sequential order claimed, and may be performed in a different order and still achieve desirable results. In addition, the techniques disclosed herein address challenges provided by wind turbines and wind farms, the techniques are not limited to these structures and thus may be applied to other complex structures (e.g., vehicles traveling along a road).

No language in the specification should be construed as indicating any non-claimed element as essential to the practice of the techniques of this disclosure. The terms "a" and "an" are used interchangeably above, and are equivalent to the phrase "one or more" as utilized in the present application. The terms "comprising," "having," "including," and "containing" are to be construed as open-ended terms (i.e., meaning "including, but not limited to,") unless otherwise noted above. The recitation of any ranges of values herein is merely intended to serve as a shorthand technique of referring individually to each separate value falling within the range, unless otherwise indicated herein, and each separate value is incorporated into the specification as if it were individually recited. The use of any and all examples, or example language (e.g., "such as"), provided herein is intended merely to better illuminate the disclosure and does not impose a limitation on the scope of the disclosure unless otherwise claimed. Finally, any papers and publications cited herein are hereby incorporated by reference in their entirety.

What is claimed is:

1. An apparatus for improving detection of targets in wind farm and other complex structure environments by pulse radar systems, the apparatus comprising:

a first threshold processor module operatively coupleable to receive for each resolution cell of said pulse radar system data representing amplitude values from signal filter processing means of said pulse radar system, wherein said first threshold processor module is adapted to determine for each resolution cell of said pulse radar system a first threshold value, said first threshold value calculated determined using a detection threshold-determining process;

a second threshold processor module operatively coupleable to receive for each resolution cell of said pulse radar system data representing amplitude values from signal filter processing means of said pulse radar system, wherein said second threshold processor module is adapted to determine a maximum amplitude value for each resolution cell of said pulse radar system, and wherein said second threshold processor module is further adapted to determine for each resolution cell a second threshold value, wherein said second threshold value is an aggregate threshold of a plurality of past maximum amplitude values over a selected number of dwells of said pulse radar system;

a comparator adapted to compare thresholds received from said first and second threshold processor modules for determining an applied threshold value for each of said resolution cells, wherein said applied threshold value is the greater of said first threshold value and said second threshold value, said comparator providing said applied threshold value to said pulse radar system to update a detection threshold value of each of said resolution cells with said applied threshold value.

2. The apparatus of claim 1, further comprising:
a map data structure stored in memory means of said pulse radar system, said map data structure including a plurality of detection cells, each of said detection cells including a code indicating the presence or absence of at least one complex structure located in said detection cell;
wherein said comparator is further adapted to apply said first threshold value if the absence of said at least one complex structure is indicated in said detection cell and is further adapted to apply said applied threshold value if the presence of said at least one complex structure is indicated in said detection cell.

3. The apparatus of claim 1, wherein said signal filter processing means comprises a plurality of zero and non-zero Doppler bins and wherein said second threshold processor module is adapted to determine said maximum amplitude value from said non-zero Doppler bins.

4. The apparatus of claim 3, wherein said second threshold processor module is further adapted to determine a maximum amplitude value from said zero and said non-zero Doppler bins.

5. The apparatus of claim 1, wherein said second threshold processor module is adapted to generate maximum amplitude values from said signal filter processing means after a plurality of radar dwells.

6. The apparatus of claim 1, wherein said second threshold processor module is adapted to generate initial maximum amplitude values from said signal filter processing means after each radar dwell and further adapted to determine said maximum amplitude value after a plurality of radar dwells.

7. The apparatus of claim 1, wherein said detection threshold-determining process uses an average of amplitude values from adjacent resolution cells.

8. The apparatus of claim 1, wherein said maximum amplitude values for each resolution cell are stored in memory means in said pulse radar system, said maximum amplitude values including a present maximum amplitude value and a plurality of past maximum amplitude values.

9. The apparatus of claim 8, wherein said memory means includes at least one positional array adapted to sequentially store said plurality of said maximum amplitude values.

10. The apparatus of claim 9, wherein said at least one positional array includes a circular buffer.

11. The apparatus of claim 9, wherein second threshold processor module is configurable to adjust a first number of said plurality of past maximum amplitude values used to determine said aggregate threshold, and wherein said first adjustable number of past maximum amplitude values used to determine said aggregate threshold includes a selected number of oldest past maximum amplitude values stored in said at least one positional array.

12. The apparatus of claim 11, wherein second threshold processor module is further configurable to adjust a second number of said plurality of past maximum amplitude values, and wherein said second adjustable number of past maximum amplitude values includes a selected number of most recent past maximum amplitude values stored in said at least one positional array.

13. The apparatus of claim 12, wherein said first adjustable number of oldest past maximum amplitude values is at least twenty and said second adjustable number most recent past maximum amplitude values is three.

14. A method for improving detection of targets in wind farm environments and other complex structure environments by pulse radar systems, comprising the steps of:

in response to at least one radar dwell, receiving data representing amplitude values from signal filter processing means of said pulse radar system for each resolution cell of said pulse radar system;

determining from said signal filter processing means a maximum amplitude value for each resolution cell for said at least one radar dwell;

comparing, by a comparator, a first adjustable number of said determined maximum amplitude values for said at least one radar dwell in order to determine an aggregate maximum amplitude threshold value for each resolution cell wherein said first adjustable number of determined maximum amplitude values includes oldest maximum amplitude values for each resolution cell;

comparing, by said comparator, said aggregate maximum amplitude threshold value with a determined detection threshold value for each resolution cell; and, applying the greater of said aggregate threshold value and said determined detection threshold value to update a threshold value for each resolution cell.

15. The method of claim 14 wherein said signal filter processing means comprises a plurality of zero and non-zero Doppler bins and said maximum amplitude value is selected from said non-zero Doppler bins.

16. The method of claim 14, further comprising the steps of:

in response to code associated with each of a plurality of detection cells of a map structure stored in memory means, said code indicating the presence or absence of at least one complex structure located in a detection cell:

(i) applying said determined detection threshold value if said code indicates the absence of said at least one complex structure in said detection cell;

(ii) applying the greater of said aggregate maximum amplitude threshold value and said determined detection threshold value if said code indicates the presence of said at least one complex structure in said detection cell.

17. The method of claim 16, further comprising the step of:

storing said determined maximum amplitude values including said first adjustable number of determined maximum amplitude values in a plurality of storage locations of at least one positional array after each radar dwell;

sequentially updating each of said plurality of storage locations with new maximum amplitude values for each resolution cell after each radar dwell.

18. The method of claim 17, wherein said plurality of said maximum amplitude values further includes a second adjustable number of determined maximum amplitude values, wherein said second adjustable number of determined maximum amplitude values includes a selected number of most recent maximum amplitude values for each resolution cell.

19. The method of claim 18, wherein said first adjustable number of determined maximum amplitude values is at least twenty and said second adjustable number of said determined maximum amplitude values is three.

20. The method of claim 16, wherein said at least one complex structure is a wind turbine.

21. An apparatus for improving detection of targets in wind farms and other complex structure environments by pulse radar systems, the apparatus comprising:

first threshold processor means operatively coupleable to receive for each resolution cell of said pulse radar system data representing amplitude values from signal filter processing means of said pulse radar system, wherein said first threshold processor means is adapted to determine for each resolution cell of said pulse radar system a first threshold value, said first threshold value calculated determined using a detection threshold-determining process;

second threshold processor means operatively coupleable to receive for each resolution cell of said pulse radar system data representing amplitude values from signal filter processing means of said pulse radar system, wherein said second threshold processor means is adapted to determine a maximum amplitude value for each resolution cell of said pulse radar system, and wherein said second threshold processor means is further adapted to determine for each resolution cell a second threshold value, wherein said second threshold value is an aggregate threshold of a plurality of oldest past maximum amplitude values over a selected number of dwells of said pulse radar system;

comparator means adapted to compare thresholds received from said first and second threshold processor means for determining an applied threshold value for each of said resolution cells, wherein said applied threshold value is the greater of said first threshold value and said second threshold value; and, map data structure means stored in memory means of said pulse radar system, said map data structure means including a plurality of detection cells, each of said detection cells including a code indicating a presence or absence of at least one wind turbine of said wind farm located in said detection cell;

wherein said comparator means is adapted to update a detection threshold value of each of said resolution cells with said first threshold value if said code indicates the absence of said at least one wind turbine in said detection cell and is further adapted to apply said applied threshold value if said code indicates the presence of said at least one wind turbine in said detection cell.

* * * * *